United States Patent
Masutani

(10) Patent No.: US 8,678,510 B2
(45) Date of Patent: Mar. 25, 2014

(54) VEHICLE SEAT

(75) Inventor: Eiji Masutani, Tochigi-ken (JP)

(73) Assignee: TS Tech Co., Ltd., Asaka-Shi (JP)

( * ) Notice: Subject to any disclaimer, the term of this patent is extended or adjusted under 35 U.S.C. 154(b) by 72 days.

(21) Appl. No.: 13/131,946

(22) PCT Filed: Dec. 28, 2009

(86) PCT No.: PCT/JP2009/071768
§ 371 (c)(1),
(2), (4) Date: Feb. 27, 2012

(87) PCT Pub. No.: WO2010/076880
PCT Pub. Date: Jul. 8, 2010

(65) Prior Publication Data
US 2012/0139324 A1 Jun. 7, 2012

(30) Foreign Application Priority Data
Dec. 29, 2008 (JP) ................................ 2008-335774

(51) Int. Cl.
*A62B 35/04* (2006.01)
*B60R 21/0136* (2006.01)
*B60R 22/00* (2006.01)

(52) U.S. Cl.
USPC .................. 297/480; 297/216.1; 297/216.15; 297/216.16; 297/216.18; 297/479

(58) Field of Classification Search
USPC ............... 297/216.1, 216.13, 216.14, 216.15, 297/216.16, 216.18, 479, 480
See application file for complete search history.

(56) References Cited

U.S. PATENT DOCUMENTS

| | | | | |
|---|---|---|---|---|
| 4,999,004 A | * | 3/1991 | Skanberg et al. | 297/480 |
| 5,143,403 A | * | 9/1992 | Fohl | 297/480 X |
| 5,188,425 A | * | 2/1993 | Foster et al. | 297/479 X |
| 5,290,062 A | * | 3/1994 | Fohl | 297/480 X |
| 5,676,397 A | * | 10/1997 | Bauer | 297/480 X |
| 5,871,236 A | * | 2/1999 | Bauer et al. | 297/480 X |
| 6,050,635 A | * | 4/2000 | Pajon et al. | 297/216.1 |
| 6,095,615 A | * | 8/2000 | Wier | 297/480 |
| 6,264,281 B1 | * | 7/2001 | Dukatz et al. | 297/480 |
| 6,648,409 B1 | * | 11/2003 | Laporte | 297/216.1 |
| 6,746,077 B2 | * | 6/2004 | Klukowski | 297/216.1 |
| 6,840,544 B2 | * | 1/2005 | Prentkowski | 297/480 X |
| 6,851,715 B2 | * | 2/2005 | Devereaux et al. | 297/480 X |
| 6,863,298 B2 | * | 3/2005 | Sakai et al. | 297/216.1 X |
| 6,866,296 B2 | * | 3/2005 | Webber et al. | 297/480 X |
| 7,533,902 B2 | * | 5/2009 | Arnold et al. | 297/480 X |

(Continued)

FOREIGN PATENT DOCUMENTS

| | | |
|---|---|---|
| JP | 2005-225476 A | 8/2005 |
| JP | 2007-210351 A | 8/2007 |
| JP | 2008-195359 A | 8/2008 |

*Primary Examiner* — Rodney B White
(74) *Attorney, Agent, or Firm* — Browdy and Neimark, PLLC

(57) ABSTRACT

An anchor plate (12) and an inner lap anchor (14) disposed at left and right sides of a vehicle seat are connected to an inner side cable (20A) and an outer side cable (20B), respectively. The anchor plate (12) and the inner lap anchor (14) are pulled substantially at the same time by a pretensioner device (21) when acceleration of a predetermined degree or more is applied to a seat (1). A support device (40) is provided between the inner lap anchor (14) and the inner side cable (20A) so as to support load applied to the inner lap anchor (14) in a distributed manner.

7 Claims, 3 Drawing Sheets

(56) References Cited

U.S. PATENT DOCUMENTS

| | | | |
|---|---|---|---|
| 7,823,924 B2 * | 11/2010 | Dewey et al. | 297/479 X |
| 7,976,066 B2 * | 7/2011 | Bok et al. | 297/479 X |
| 8,109,568 B2 * | 2/2012 | Masutani | 297/216.1 X |
| 8,113,575 B2 * | 2/2012 | Masutani | 297/216.1 |
| 8,434,819 B2 * | 5/2013 | Guerrero | 297/216.1 X |
| 2003/0155801 A1 * | 8/2003 | Tatematsu et al. | 297/480 |
| 2004/0051353 A1 * | 3/2004 | Klukowski | 297/216.1 |
| 2011/0089727 A1 * | 4/2011 | Masutani | 297/216.1 |
| 2011/0121620 A1 * | 5/2011 | Masutani | 297/216.1 |
| 2011/0121621 A1 * | 5/2011 | Masutani | 297/216.1 |
| 2011/0198910 A1 * | 8/2011 | Masutani | 297/480 |
| 2011/0210586 A1 * | 9/2011 | Masutani | 297/216.1 |
| 2012/0112503 A1 * | 5/2012 | Masutani | 297/216.1 |

* cited by examiner

VEHICLE SEAT

TECHNICAL FIELD

The present invention provides a vehicle seat restraining a seat occupant in a preferable manner when a vehicle is collided.

BACKGROUND ART

In the past, a configuration is known in which a pretensioner device, which is activated when acceleration of a predetermined degree or more is applied to a vehicle seat, is connected to one of an anchor plate and an inner lap anchor for connection with end portions of a seat belt (see Patent Document 1).

In the past, a configuration is known in which one end of a seat belt of a vehicle seat is fixed to an anchor plate, and an inner lap anchor having an inner buckle detachably engaging with a tongue plate disposed at a middle portion of the seat belt is provided, so that the anchor plate and the inner lap anchor respectively disposed at the right and the left are respectively pulled by wire cables connected to a pretensioner device that is activated when acceleration of a predetermined degree or more is applied to a vehicle seat (see Patent Document 2).

Patent Document 1: JP 2003-146184A
Patent Document 2: JP 2008-195359A

DISCLOSURE OF THE INVENTION

In the configuration of the above Patent Document 1, only one of the anchor plate and the inner lap anchor is simply pulled by the pretensioner device in order to restrain the seat occupant by increasing the degree of tension applied to the seat belt, and the seat belt is pulled from one of the right side and the left side for the seat occupant of the vehicle seat. Therefore, the configuration of the above Patent Document 1 has a drawback in that the length for which the seat belt can be pulled (stroke for which the seat belt can be pulled) is limited, and the restraining effect of the seat occupant cannot be improved.

In the configuration of the above Patent Document 2, when both the anchor plate and the inner lap anchor respectively disposed at the right and the left are pulled by the pretensioner device, a sufficient length can be pulled, which improves the restraining effect. However, the configuration of the above Patent Document 2 has a drawback in that the support load at the right and the support load at the left are different, and this makes the restraining posture unstable in some cases.

The present application is devised to pull, substantially at the same time, both of the anchor plate and the inner lap anchor respectively disposed at the right and the left even when only one pretensioner device is provided, wherein the restraining posture is stabilized.

In the present invention, an anchor plate 12 and an inner lap anchor 14 respectively disposed at the right and the left can be moved substantially at the same time in such direction that the seat belt 10 restrains a passenger. In addition, a support load applied to the inner lap anchor 14 is sufficiently ensured with a support device 40, and the posture of the seat occupant in the restrained state is stabilized. This improves the restraining performance for restraining the passenger to the vehicle seat 1, and moreover the device can be provided at a low cost.

In the present invention, the support device 40 includes a moving side pulley 41 and a fixing structure for fixing the end portion of the inner side cable 20A to a fixing portion S at the side of the vehicle seat 1 or the vehicle. While the structure is extremely simple, the support load of the inner lap anchor 14 can be sufficiently ensured, and the device can be structured quite reasonably.

In the present invention, a fixed side pulley 45 is provided between a pretensioner device 21 and the moving side pulley 41. This allows smooth movement of the inner side cable 20A, and can improve the reliability of the action.

In the present invention, since the fixed side pulley 45 is disposed on the slide rail 5. This allows smooth movement of the inner side cable 20A and the outer side cable 20B, and tension can be quickly applied to the seat belt 10, so that the reliability of restraining the passenger to the vehicle seat 1 can be improved.

In the present invention, both the inner side cable 20A and the outer side cable 20B are pulled using reaction force of a cylinder 23 and the piston 24 of the pretensioner device 21. Therefore, the increase of the cost can be minimized with a simple structure, and the restraining performance to the vehicle seat 1 can be improved without changing the sitting posture of the seat occupant.

In the present invention, the pretensioner device 21 has the cylinder 23 arranged to be freely movable. Therefore, both the inner side cable 20A and the outer side cable 20B can be pulled using the reaction force of the cylinder 23 and the piston 24.

In the present invention, since the pretensioner device 21 is arranged at the lower side of the front side of the seat bottom 3 of the vehicle seat 1, a seat occupant restraining mechanism can be installed without sacrificing the ease of accommodation of the legs of the seat occupant at a vehicle seat 1 behind this vehicle seat 1, while the pretensioner device 21 can be reliably activated in a preferable manner.

BEST MODE FOR CARRYING OUT THE INVENTION

Figure 1:
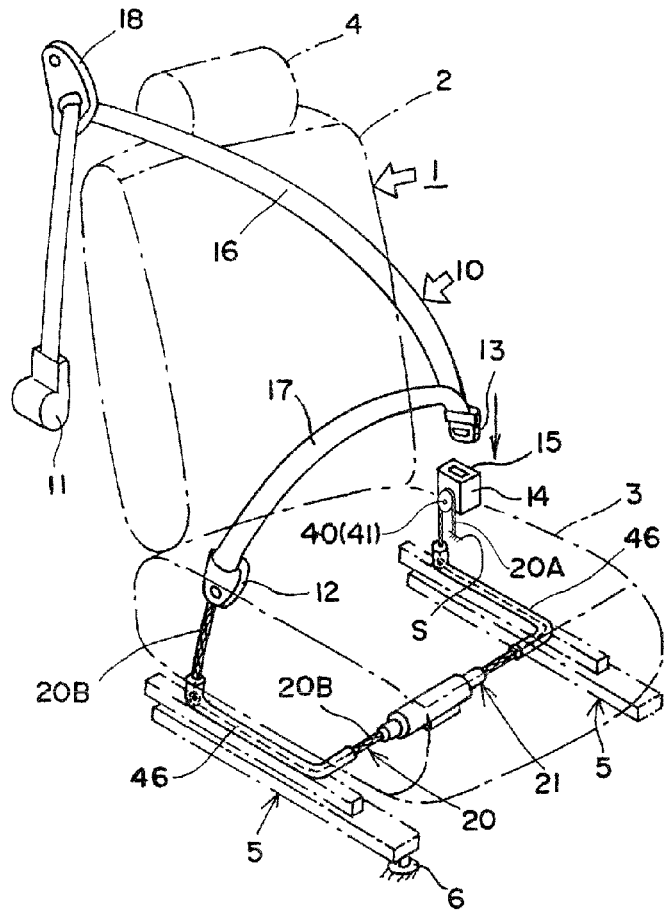
FIG. 1 is a perspective view illustrating a vehicle seat and a seat belt.
Figure 2:
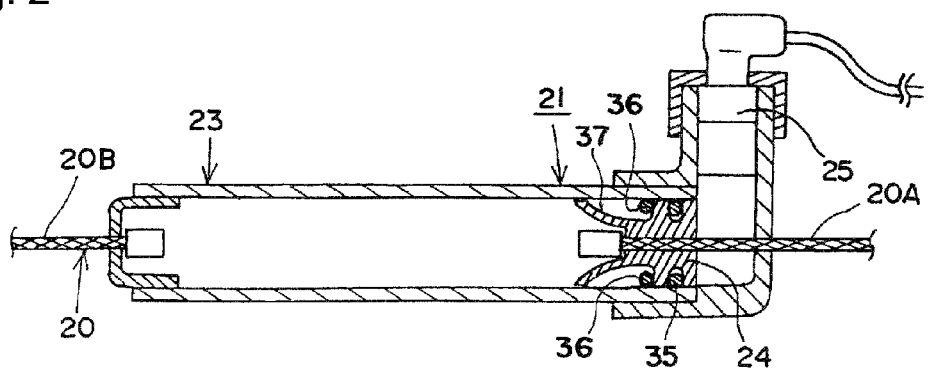
FIG. 2 is a cross sectional view illustrating an example of a pretensioner device.

An embodiment of the present invention will be explained with reference to drawings. A vehicle seat 1 includes a seat back 2 of the vehicle seat 1, a seat bottom 3, and a head rest 4 provided above the seat back 2. The vehicle seat 1 is attached in such a manner that the seat bottom 3 is fixed to a vehicle 6 or the vehicle seat 1 is attached to the vehicle 6 in such a manner that the position of the vehicle seat 1 can be freely adjusted in a front/back direction with respect to the vehicle 6 with slide rails 5 of a known front/back position adjustment device provided on the vehicle (Although directions and positions such as front, back, left, right, upper side, and lower side are shown in the explanation to allow easy understanding, such description does not limit the configuration of the invention).

The vehicle seat 1 is provided with a seat belt 10. The seat belt 10 protects a passenger who sits on the vehicle seat 1 by restraining the passenger to the vehicle seat 1. One end of the seat belt 10 is connected to a belt retractor 11 provided on the vehicle or the vehicle seat 1, and the other end of the seat belt 10 is fixed to an anchor plate 12. A tongue plate 13 is disposed at a middle portion of the seat belt 10. The tongue plate 13 is detachably engaged with an inner buckle 15 of an inner lap anchor 14 provided to make a pair with the anchor plate 12.

When the tongue plate 13 is engaged with the inner buckle 15, a portion of the seat belt 10 from the one end to the tongue plate 13 serves as a shoulder belt 16, and a portion from the tongue plate 13 to the anchor plate 12 serves as a lap belt 17. Numeral 18 denotes a through anchor.

The belt retractor 11 has a known configuration and may have a mechanism in which the seat belt 10 is usually allowed to be pulled out, but when an impact (undesirable external force that causes a passenger to rapidly move forward) is applied, the seat belt 10 is locked so that it cannot be pulled out, and the mechanism prohibits the seat belt 10 from being pulled out.

The tongue plate 13 also has a known configuration, in which the tongue plate 13 is freely movable with respect to the seat belt 10, but is configured not to move with respect to the seat belt 10 when, for example, the seal belt 10 is pulled out in normal times.

The inner lap anchor 14 is connected to one end side of an inner side cable 20A of a pair of right and left wire cables 20. The anchor plate 12 is connected to one end side of an outer side cable 20B of the pair of wire cables 20. The other end of the inner side cable 20A and the other end of the outer side cable 20B are attached to a pretensioner device 21.

The pretensioner device 21 is configured such that when a collision detection device (not shown) disposed at a desired position of the vehicle detects collision, the pretensioner device 21 generates a large amount of gas using gas generation agent to instantly pull the two wire cables 20, thereby actively applying tension to the seat belt 10, so that the passenger is restrained to the vehicle seat 1. An end portion of one of the inner side cable 20A and the outer side cable 20B is connected (fixed) to a piston 24 provided in a cylinder 23 of the pretensioner device 21, and the other end portion of the one of the inner side cable 20A and the outer side cable 20B is connected (fixed) to an end portion of the cylinder 23.

In the embodiment, the outer side cable 20B is fixed to the cylinder 21, and the inner side cable 20A is connected to the piston 12. The piston 12 is placed in the cylinder 11 at the side where the outer side cable 20B is fixed. The inner side cable 20A and the outer side cable 20B are provided in a state as strained strings with the cylinder 11 interposed between the anchor plate 12 and the inner lap anchor 14.

The pretensioner device 21 is structured such that the cylinder 23 is provided with a gas generator 25 for supplying a large amount of gas for moving the piston 24. The pretensioner device 21 pulls the two wire cables 20 to pull, substantially at the same time, the anchor plate 12 and the inner lap anchor 14 respectively disposed at the right and the left, thus restraining the passenger to the vehicle seat 1.

Figure 3:
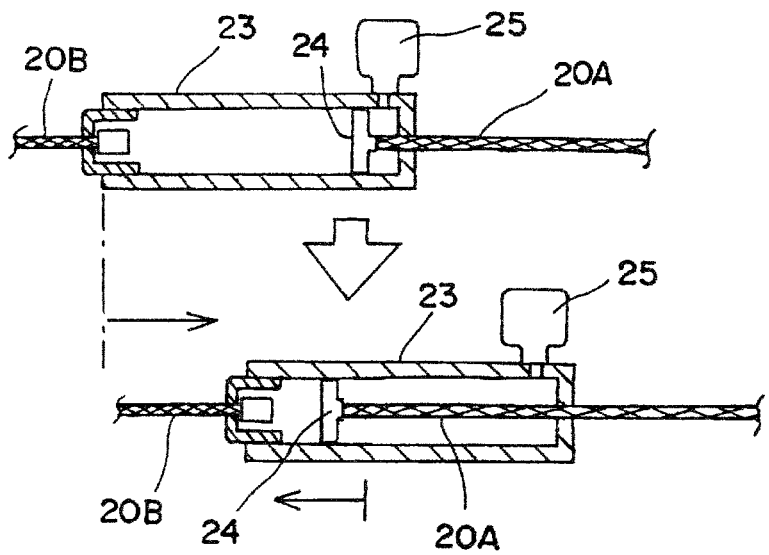
FIG. 3 is a schematic diagram illustrating moving state of the pretensioner device and moving state of cables when the pretensioner device is activated.

The pretensioner device 21 is placed such that the pulling direction of the wire cable 20 and the axis of the cylinder 23 are in parallel to the vehicle seat 1 or the vehicle, and the cylinder 23 is installed so as to be freely movable in the axial direction of the pretensioner device 21. In other words, reaction force of the piston 24 instantly moved by the large amount of gas generated by the gas generator 25 acts on the cylinder 23, and the piston 24 and the cylinder 23 relatively move in the opposite directions from each other (FIG. 3).

Therefore, even though only one pretensioner device 21 is provided, the inner side cable 20A connected to the piston 24 and the outer side cable 20B connected to the cylinder 23 are pulled substantially at the same time, whereby the two wire cables 20 apply tension to the seat belt 10, so that the passenger is restrained to the vehicle seat 1.

The arrangement (wiring) of the wire cable 20 and the arrangement position of the pretensioner device 21 are such that the pretensioner device 21 is provided on a lower surface of a front side of the seat bottom 3. The pulling direction of the inner side cable 20A and the outer side cable 20B pulled in the lateral direction by the pretensioner device 21 is converted into a front/back direction using cable guides 46. The anchor plate 12 and the inner lap anchor 14 are connected to ends of the inner side cable 20A and the outer side cable 20B converted by the respective cable guides 46.

Even if the load applied to the lap belt 17 is distributed and supported by the anchor plate 12 and the inner lap anchor 14 respectively disposed at the right and the left in a substantially uniform manner, the support load applied by the shoulder belt 16 is added to the inner lap anchor 14, and due to this load, the support load of the inner lap anchor 14 is larger than that of the anchor plate 12, which makes the restraining posture unstable. Therefore, a support device 40 is provided to reliably support the load applied to the inner lap anchor 14 by the support device 40, and the load balance of the anchor plate 12 and the inner lap anchor 14 at the right and the left is adjusted in a preferable manner.

The support device 40 may be configured in any manner. In the embodiment, the load that can be supported by the inner side cable 20A is increased by a lateral axis rotating pulley (moving side pulley) 41, and this maintains preferable load balance of the anchor plate 12 and the inner lap anchor 14 at the right and left. In other words, the load is distributed and supported by the two inner side cables 20A wound around the moving side pulley 41, so that the load-bearing ability is increased with the force-increasing mechanism using the principle of pulley.

The moving side pulley 41 is attached to the inner lap anchor 14 with an attachment shaft 42 so that the moving side pulley 41 is free with respect to only rotation, and when the inner lap anchor 14 is pulled (moved upward) by the load applied to the shoulder belt 16, the moving side pulley 41 moves together with the inner lap anchor 14. One end side of the inner side cable 20A is wound around the moving side pulley 41, and the end portion of the inner side cable 20A is fixed to a fixing portion S. In the embodiment, the fixing portion S is made with a stay 43 fixed to an upper rail 30 of the slide rail 5.

Numeral 45 denotes fixed side pulleys provided on the right and left upper rails 30 of the slide rails 5. The fixed side pulley 45 is provided to freely rotate with the lateral shaft, and the wire cables 20 are respectively wound around the lower surface sides of the fixed side pulleys 45. In other words, the pretensioner device 21 is disposed at the front side. The fixed side pulleys 45 are disposed at the rear side with respect to the pretensioner device 21. The moving side pulleys 41 are provided above the fixed side pulleys 45. The end portion of the inner side cable 20A is fixed to the fixing portion (stay 43) S below the moving side pulley 41.

Therefore, since the fixed side pulley 45 is disposed at the rear side with respect to the pretensioner device 21, not only the wire cable 20 can be pulled for a sufficient length, but also the moving direction of the wire cable 20 is reasonably supported by the fixed side pulley 45 in accordance with the load direction applied to the anchor plate 12 and the inner lap anchor 14. In addition, the moving side pulley 41 is disposed above one of the fixed side pulleys 45, and the end portion of the inner side cable 20A is fixed to the fixing portion (stay 43)

S below the moving side pulley 41, and therefore, the moving side pulley 41 can be arranged so as to achieve the best load distribution as a pulley.

The piston 12 is arranged with an O-ring 35. In addition, the piston 12 is formed with an inclined surface 37 having a smaller diameter as closer to the front side in the moving direction, and a steel ball 36 serving as a stopper for stopping returning movement of the piston 12 is provided in a space between the inclined surface 37 and the inner peripheral surface of the cylinder 11.

Figure 4:
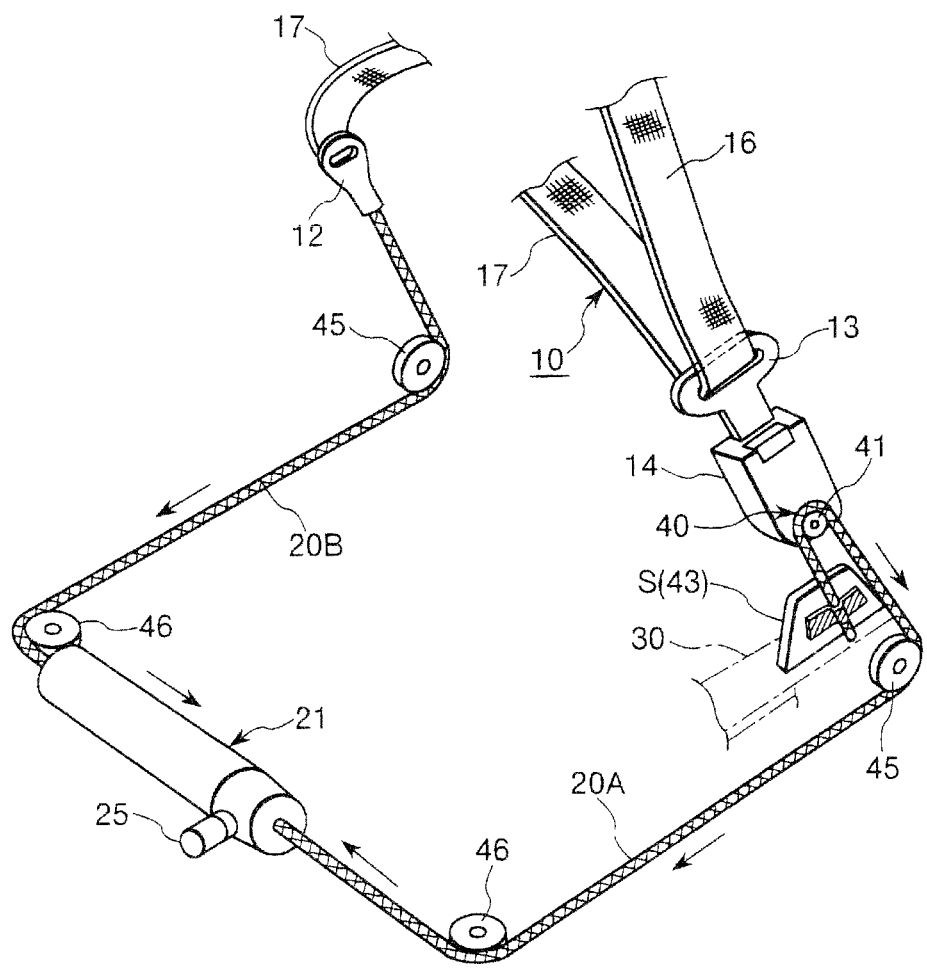
FIG. 4 is a perspective view schematically illustrating arrangement of the pretensioner device and wire cables.
Figure 5:
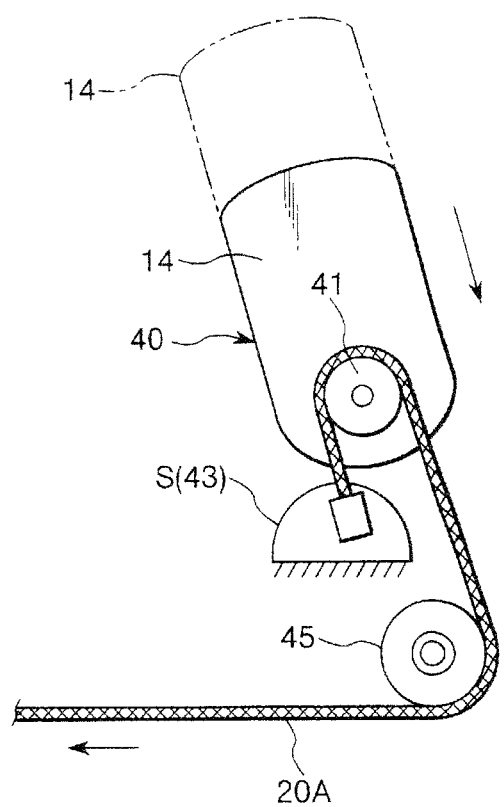
FIG. 5 is a side view illustrating an activated state of a support device.

The cable guide 46 of FIG. 1 is formed in a cylindrical shape. The cable guides 46 are configured to change the pulling directions of the inner side cables 20A and the outer side cables 20B, and the fixed side pulleys 45 are provided in the rear portions of the cable guides 46. However, in FIG. 4, the cable guides 46 are made with pulleys or rollers. The configuration for changing the pulling directions of the inner side cable 20A and the outer side cable 20B may be configured in any way, and is not limited to the embodiment.

Action of the Embodiment

The seat occupant sits down on the seat bottom 3, adjusts the position in a front/back direction by moving the entire vehicle seat 1 with respect to the vehicle 6 along the slide rails 5, brings his/her back in contact with the seat back 2, adjusts the inclination angle of the seat back 2 using a reclining device, and fastens the seat belt 10 by engaging the tongue plate 13 of the seat belt 10 with the inner buckle 15.

When the front side of the vehicle is collided while the vehicle is in motion, the collision causes the seat occupant to relatively move to the front side with respect to the vehicle seat 1 due to inertial force. However, since the seat belt 10 is provided, the seat occupant is restrained to the vehicle seat 1.

Although the seat occupant is restrained with the seat belt 10, the restraining effect of the seat belt 40 at the time of the collision can be improved only to a limited level. Therefore, in recent years, a pretensioner has been used to actively apply tension to the seat belt at the time of the collision so as to restrain the seat occupant. However, in a conventional configuration for applying tension to the seat belt, only one side of the right and left of the seat belt is pulled, and this imposes limitations on the improvement of the restraining effect that is achieved by causing the restraining force to rise more quickly.

In the present application, the anchor plate 12 and the inner lap anchor 14 at the right and the left of the seat belt 10 are moved by the pretensioner device 21 with respect to the vehicle seat 1 at the time of the collision. Accordingly, at the time of the collision, the anchor plate 12 and the inner lap anchor 14 at the right and the left of the seat belt 10 move substantially at the same time, and this applies tension (restraining force) to the entire seat belt 10 via the lap belt for the seat occupant.

Since the ends of the inner side cable 20A and the outer side cable 20B of the wire cables 20 are attached to the pretensioner device 21, the pretensioner device 21 ignites the gas generation agent to generate a large amount of gas when the collision detection device (not shown) disposed at a desired position of the vehicle detects collision, and the wire cables 20 are pulled instantly with the large amount of gas, whereby tension is actively given to the seat belt 10, so that the passenger is restrained to the vehicle seat 1.

In this case, one of the inner side cable 20A and the outer side cable 20B is connected to the piston 24 disposed in the cylinder 23 of the pretensioner device 21, and the other of the inner side cable 20A and the outer side cable 20B is connected to the end portion of the cylinder 23. Therefore, with only one pretensioner device 21, the anchor plate 12 and the inner lap anchor 14 respectively disposed at the right and the left can be pulled substantially at the same time to shorten the length of the seat belt 10, and the passenger is instantly restrained to the vehicle seat 1.

Even when the pretensioner device 21 pulls, substantially at the same time, the anchor plate 12 and the inner lap anchor 14 respectively disposed at the right and the left, the support load applied to the shoulder belt 16 is added to the inner lap anchor 14, and due to this load, the loads supported by the anchor plate 12 and the inner lap anchor 14 respectively disposed at the right and the left become different, which disrupts the load balance of the anchor plate 12 and the inner lap anchor 14 and makes the restraining posture unstable. However, in the present application, the support device 40 is disposed at the side of the inner lap anchor 14. The support device 40 supports the load of the inner side cable 20A in a distributed manner, thereby reducing variation of the support load of the inner lap anchor 14 and the support load of the anchor plate 12, and improving the restraining effect of the seat belt 10.

Since the support device 40 supports the load applied to the inner side cable 20A using the moving side pulley 41 in a distributed manner, the support device 40 can be made simply, and the space in which the support device 40 is installed and the space required to activate the support device 40 can be reduced. In other words, the accurate value of the support load differs according to conditions. If it is assumed that, for the sake of easy understanding, the load applied to the lap belt 17 is supported substantially equally by the anchor plate 12 and the inner lap anchor 14 respectively disposed at the right and the left in a distributed manner, one of the two inner side cables 20A wound around the moving side pulley 41 supports the load applied to the lap belt 17, and the remaining one of the two inner side cables 20A supports the load applied to the shoulder belt 16. Therefore, as compared with the conventional structure of the seat belt 10, the load balance of the anchor plate 12 and the inner lap anchor 14 becomes more preferable.

Therefore, with the support device 40, the load supported by the inner lap anchor 14 can be made substantially the same as or close to the support load of the anchor plate 12, so that the seat occupant is restrained in a preferable manner. In this case, the fixed side pulleys 32 are respectively provided on the right and left upper rails 30 of the slide rails 5, and the fixed side pulley 32 is located below the moving side pulley 41. Therefore, the moving direction of the inner side cable 20A is converted by the moving side pulley 41 and the fixed side pulley 32, which makes the action smoother.

The pretensioner device 21 is placed such that the pulling direction of the wire cable 20 and the axis of the cylinder 23 are in parallel to the vehicle seat 1 or the vehicle, and the cylinder 23 is installed so as to be freely movable in the axial direction of the pretensioner device 21. Therefore, reaction force of the piston 24 instantly moved by the large amount of gas generated by the gas generator 25 acts on the movable cylinder 23, and the piston 24 and the cylinder 23 relatively move in the opposite directions from each other (in a direction for shortening the relative distance).

Therefore, the inner side cable 20A connected to the piston 24 and the outer side cable 20B connected to the cylinder 23 are pulled substantially at the same time, and the wire cable 20 can restrain the passenger to the vehicle seat 1. The number of component parts constituting the seat occupant restraining mechanism can be reduced, and can be provided at a low cost.

Since the pretensioner device 21 is arranged at the lower side of the front side of the seat bottom 3 of the vehicle seat 1, the seat occupant restraining mechanism can be installed without sacrificing the ease of accommodation of the legs of the seat occupant at a vehicle seat 1 behind this vehicle seat 1, while the pretensioner device 21 can be reliably activated in a preferable manner.

Each embodiment explained above is illustrated and explained separately or together for the sake of easy understanding. However, the above embodiments can be combined in various manners, and these expressions are not intended to limit the configuration, actions, and the like. Moreover, it is to be understood that synergic effect may be achieved in some cases.

The invention claimed is:

1. A vehicle seat, wherein one end of a seat belt (10) is connected to a belt retractor (11) provided on a vehicle or a vehicle seat (1), and the other end of the seat belt (10) is fixed to an anchor plate (12), wherein a tongue plate (13) is provided in a middle portion of the seat belt (10) to detachably engage with an inner buckle (15) of an inner lap anchor (14), in such a manner that a portion of the seat belt (10) from one end to the tongue plate (13) is configured as a shoulder belt (16), and a portion thereof from the tongue plate (13) to the anchor plate (12) is configured as a lap belt (17), wherein the anchor plate (12) and the inner lap anchor (14) respectively disposed at right and left sides of the vehicle seat are configured to be respectively pulled substantially at the same time by an inner side cable (20A) and an outer side cable (20B) of wire cables (20) connected to a pretensioner device (21) that is activated when acceleration of a predetermined degree or more is applied to the vehicle seat (1), and wherein a support device (40) is provided between the inner lap anchor (14) and the inner side cable (20A) to support load applied to the inner lap anchor (14) in a distributed manner.

2. The vehicle seat according to claim 1, wherein the support device (40) is configured such that the inner side cable (20A) between the pretensioner device (21) and the inner lap anchor (14) is wound around a moving side pulley (41), and a fixing structure is provided to fix an end portion of the inner side cable (20A) to a fixing portion (S) on a vehicle or a side of the vehicle seat (1).

3. The vehicle seat according to claim 2, wherein the moving side pulley (41) is provided on the inner lap anchor (14), and a fixed side pulley (45) for changing a moving direction of the inner side cable (20A) is provided on a stay (43) disposed on an upper rail (30) of a slide rail (5) that allows the vehicle seat (1) to freely move in a front/back direction, and wherein the inner side cable (20A) extending from the pretensioner device (21) is wound around the fixed side pulley (45) and the moving side pulley (41), and an end portion of the inner side cable (20A) is fixed to the stay (43).

4. The vehicle seat according to claim 3, wherein the outer side cable (20B) extending from the pretensioner device (21) is wound around the fixed side pulley (45) for changing the moving direction of the outer side cable (20B) disposed at a side of the upper rail (30) of the slide rail (5), and wherein an end portion of the outer side cable (20B) is fixed to the anchor plate (12).

5. The vehicle seat according to claim 4, wherein the other end of one of the inner side cable (20A) and the outer side cable (20B) of the wire cables (20) is connected to a piston (24) arranged in a cylinder (23) of the pretensioner device (21), and the other end of the other one of the inner side cable (20A) and the outer side cable (20B) is connected to the cylinder (23), and wherein the cylinder (23) and the piston (24) are configured to move oppositely with reaction force.

6. The vehicle seat according to claim 5, wherein the cylinder (23) is configured such that an axial direction of the cylinder (23) and moving directions of the inner side cable (20A) and the outer side cable (20B) of the wire cables (20) are arranged substantially in parallel.

7. The vehicle seat according to claim 6, wherein the cylinder (23) of the pretensioner device (21) is arranged at a lower side of a front side of a seat bottom (3) of the vehicle seat (1) such that an axis thereof is disposed in a lateral direction.

* * * * *